United States Patent [19]

Schenk et al.

[11] 4,283,426
[45] Aug. 11, 1981

[54] CELLULOSE HYDRATE TUBING WITH AGING-RESISTANT BARRIER LAYER AND PROCESSES FOR THE MANUFACTURE THEREOF

[75] Inventors: Harald Schenk; Hermann Winter; Walter Spietschka, all of Wiesbaden, Fed. Rep. of Germany

[73] Assignee: Hoechst Aktiengesellschaft, Frankfurt am Main, Fed. Rep. of Germany

[21] Appl. No.: 60,366

[22] Filed: Jul. 25, 1979

[30] Foreign Application Priority Data

Jul. 27, 1978 [DE] Fed. Rep. of Germany ....... 2832926

[51] Int. Cl.³ .................. F16L 11/00; B65D 81/34; B05D 3/12; A23G 1/00
[52] U.S. Cl. ............................. 426/105; 138/118.1; 426/135; 427/356; 427/385.5; 428/36
[58] Field of Search ............... 428/36; 426/105, 135, 426/127; 427/355, 356, 385 R; 138/118.1

[56] References Cited

U.S. PATENT DOCUMENTS

| | | | |
|---|---|---|---|
| 2,748,027 | 5/1956 | Meier | 138/118.1 |
| 2,961,323 | 11/1960 | Underwood et al. | 427/392 |
| 2,961,340 | 11/1960 | Meler | 138/118.1 |
| 3,005,728 | 10/1961 | Bridgeford | 138/118.1 |
| 3,108,017 | 10/1963 | Messwarb et al. | 138/118.1 |
| 3,353,991 | 11/1967 | Shelburg et al. | 138/118.1 |
| 3,794,515 | 2/1974 | Turbak et al. | 428/36 |
| 3,826,676 | 7/1974 | Heling et al. | 426/135 |
| 3,886,979 | 6/1975 | Rasmussen | 426/135 |
| 3,887,713 | 6/1975 | Rasmussen et al. | 428/36 |
| 3,889,018 | 6/1975 | Quint | 427/356 |
| 4,076,865 | 2/1978 | Wallsten | 427/356 |
| 4,097,623 | 6/1978 | Hammer et al. | 426/105 |
| 4,097,963 | 7/1978 | Hammer et al. | 426/135 |
| 4,192,964 | 3/1980 | Gerigk et al. | 138/118.1 |

FOREIGN PATENT DOCUMENTS 1939576 2/1971 Fed. Rep. of Germany ........ 426/135
1174046 12/1969 United Kingdom .

Primary Examiner—William R. Dixon, Jr.
Attorney, Agent, or Firm—Schwartz, Jeffery, Schwaab, Mack, Blumenthal & Koch

[57] ABSTRACT

Disclosed is a packaging material comprising a base layer of cellulose hydrate having on one surface a film coating which is impervious to water vapor, water and oxygen and which comprises a vinylidene chloride copolymer containing from about 90 to 92 percent by weight of vinylidene chloride, from about 5.5 to 7 percent by weight of acrylonitrile, from about 1.5 to 3.5 percent by weight of methyl methacrylate and from about 0.5 to 1.5 percent by weight of itaconic acid, said copolymer having a relative viscosity of about 1.04 measured at 23° C. in a 0.1 percent strength by weight solution in a mixture of tetrahydrofuran and toluene in the ratio of 70:30, and a relative viscosity of 2.8 measured at 23° C. in a 3 percent by weight solution in a mixture of tetrahydrofuran and toluene in the ratio of 70:30, and said film coating having a thickness corresponding to a weight per unit area in the range between about 3 and 10 g/m². Also disclosed are a sausage casing of such material and a method for producing same.

23 Claims, 3 Drawing Figures

CELLULOSE HYDRATE TUBING WITH AGING-RESISTANT BARRIER LAYER AND PROCESSES FOR THE MANUFACTURE THEREOF

BACKGROUND OF THE INVENTION

The present invention relates to packaging material, preferably fiber-reinforced packaging casings in the form of tubing based on cellulose hydrate and having on their outside an elastic film coating which is based on an elastomer and which has adequate barrier layer properties against the permeation of water, water vapor and oxygen, even after aging of the casing and a subsequent circumferential extension. Preferably, these materials are used as an artificial casing for boiled and cooked sausages. The present invention also relates to processes for the manufacture of these packaging materials.

It is known to provide cellulose hydrate tubing on its outside with a coating based on a vinylidene chloride copolymer (U.S. Pat. No. 2,961,323). The tubing manufactured in accordance with the known teaching and coated on the outside has, however, the disadvantage that the polymer coating on the outside of the tubing does not provide an adequate barrier action against water, water vapor and oxygen during use of the tubing according to the intended purpose as artificial sausage casings. This occurs since the coatings no longer withstand the tensile stress of the casings which occurs at a circumferential extension of more than 10% during filling of the casings with sausage-meat or during the increase in volume of the filling, which takes place when the sausages are boiled (in particular if the coatings have aged), and the coatings then become permeable to water, water vapor and oxygen in an undesirable manner. The circumferential extension by more than 10% of the known casings with a coating of vinylidene chloride copolymer on the outside, in particular after aging of the casing and a subsequent circumferential extension thereof by 10%, reduces the original elasticity of the coating to such an extent that the latter does not have an adequate barrier layer function against the permeation of water, water vapor and oxygen following such measures. The influence of the circumferential extension of the casing in the range of from 10% to 35% on the properties of its film coating or the influence of the circumferential extensibility of the aged casing in the range from 10% to 35% on the barrier action of its film coating, in each case against the permeation of water, water vapor and oxygen, is equated (as a definition within the scope of the description of the invention) to that which occurs during a corresponding extension of a self-supporting film immediately after its manufacture or in the case of a corresponding aged self-supporting film, in each case with respect to its barrier layer action against the permeation of water, water vapor and oxygen. The self-supporting films consist in each case of a copolymer which, in its qualitative and quantitative chemical build-up and in its physical characteristic data, corresponds to that from which the film coating of the casing is formed.

SUMMARY OF THE INVENTION

It is therefore an object of the present invention to provide an improved packaging material.

A further object of the invention resides in the provision of an improved packaging material based on cellulose hydrate which has improved barrier layer properties.

It is also an object of the invention to provide a packaging material which has a lacquer film coating of vinylidene chloride copolymer on the outside.

It is a particular object of the invention to provide a sausage casing of the above-mentioned type wherein the coating possesses an adequate barrier layer action against the permeation of water, water vapor and oxygen even in the aged state of the casing and after a circumferential extension (radial extension) thereof in the range of from 10 to 35%.

It is also an object of the invention to provide an improved sausage having its casing made from the packaging material according to the invention.

Another object of the invention resides in the provision of a method for producing the improved packaging material according to the invention.

In accomplishing the foregoing objects, there has been provided in accordance with one aspect of the present invention a packaging material, preferably in tubular form, comprising a base layer of cellulose hydrate having on one surface a film coating which is impervious to water vapor, water and oxygen and which comprises a vinylidene chloride copolymer containing from about 90 to 92 percent by weight of vinylidene chloride, from about 5.5 to 7 percent by weight of acrylonitrile, from about 1.5 to 3.5 percent by weight of methyl methacrylate and from about 0.5 to 1.5 percent by weight of itaconic acid. The copolymer has a relative viscosity of about 1.04 measured at 23° C. in a 0.1 percent strength by weight solution in a mixture of tetrahydrofuran and toluene in the ratio of 70:30, and a relative viscosity of 2.8 measured at 23° C. in a 3 percent by weight solution in a mixture of tetrahydrofuran and toluene in the ratio of 70:30 and the film coating has a thickness corresponding to a weight per unit area in the range between about 3 and 10 g/m$^2$. Preferably, the film coating has, at 4° C., a modulus of elasticity value after aging which is at most twice that of the film coating before aging, and wherein the value before aging is approximately 1,200 N/mm$^2$.

In accordance with another aspect of the present invention, there has been provided a sausage product comprising an artificial sausage casing and a meat-containing filling therein, wherein the sausage casing is made from a packaging material as defined above.

According to still another aspect of the invention, there has been provided a process for the manufactue of the above-described packaging material which comprises the steps of drawing a web of cellulose hydrate, preferably in the form of a flattened tube, from a stock roll, applying a liquid lacquer solution to one side of the moving web, the solution containing a copolymer comprising from about 90 to 92 percent by weight of vinylidene chloride, from about 5.5 to 8 percent by weight of acrylonitrile, from about 1.5 to 3.5 percent by weight of methylmethacrylate and from about 0.5 to 1.5 percent by weight of itaconic acid, this copolymer having a relative viscosity of about 1.04 measured at 23° C. in a 0.1 percent strength by weight solution in a mixture of tetrahydrofuran and toluene in the ratio of 70:30, and a relative viscosity of about 2.8, measured at 23° C. in a 3 percent strength by weight solution in a mixture of tetrahydrofuran and toluene in the ratio of 70:30, levelling the lacquer to a predetermined thickness and drying it to give a film coating of the copolymer having a thickness corresponding to a weight per unit area in the range between about 3 and 10 g/m². Preferably, the lacquer solution contains a liquid, volatile fraction, preferably an organic liquid in the range of from about 70 to 90 percent by weight relative to the total weight of the lacquer solution.

Further objects, features and advantages of the invention will become apparent from the detailed description of the invention which follows, when considered in light of the accompanying drawings.

DETAILED DESCRIPTION OF PREFERRED EMBODIMENTS

Figure 1:
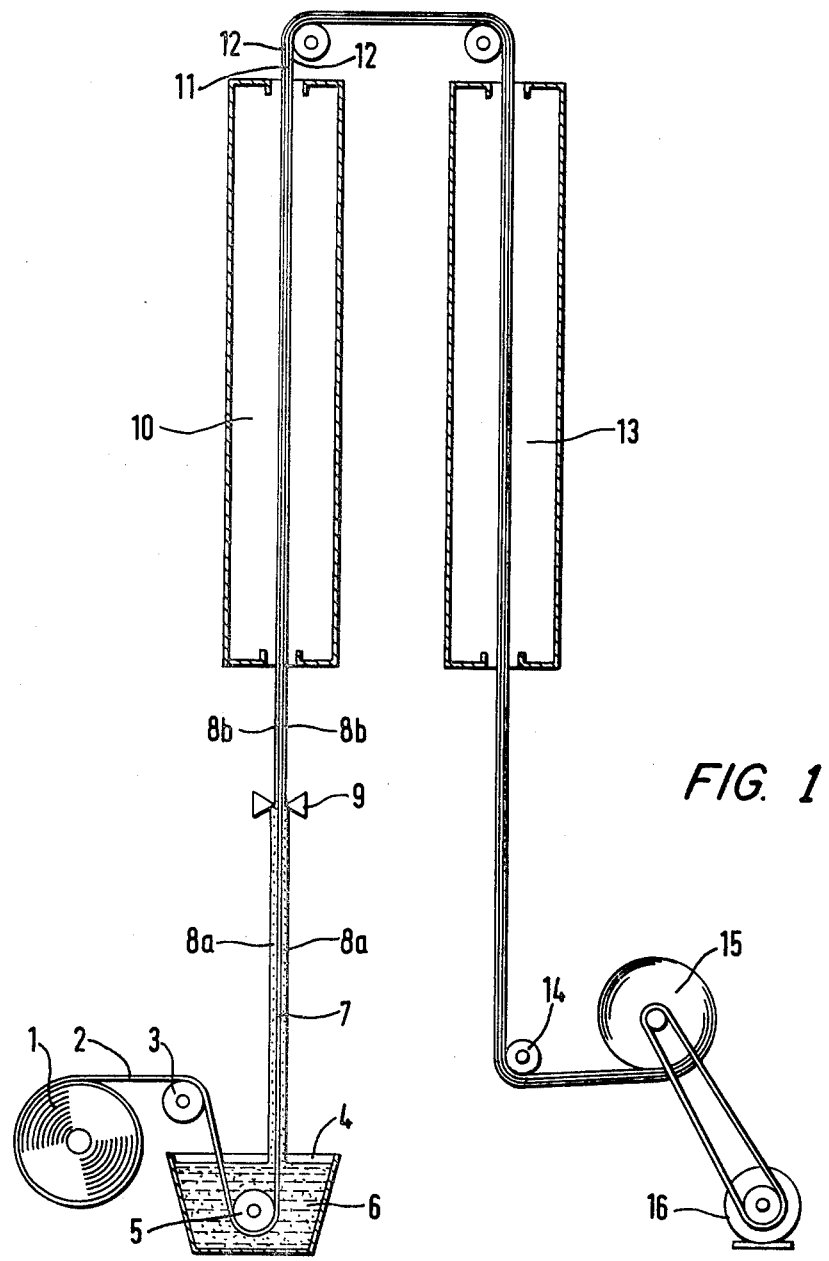
FIG. 1 is a schematic illustration of the apparatus and process for producing the packaging material according to the invention.

The terms "lacquer film coating" and "film coating" always have the same meaning in the following text.

The invention provides a packaging material in the form of tubing, based on cellulose hydrate and having on its outside a film coating which is impervious to water vapor, water and oxygen and which contains a vinylidene chloride copolymer, wherein the film coating comprises a copolymer of from about 90 to 92 percent by weight of vinylidene chloride, from about 5.5 to 7 percent by weight of acrylonitrile, from about 1.5 to 3.5 percent by weight of methyl methacrylate and from about 0.5 to 1.5 percent by weight of itaconic acid. The data on the percentages by weight relate in each case to the total weight of the copolymer which has a relative viscosity of about 1.04, measured at 23° C. in a 0.1 percent strength by weight solution in a mixture of tetrahydrofuran and toluene in the ratio of 70:30, and a relative viscosity of about 2.8, measured at 23° C. in a 3 percent strength by weight solution in a mixture of tetrahydrofuran and toluene in the ratio of 70:30. The copolymer coating has a thickness corresponding to a weight per unit area in the range between about 3 and 10 g/m². The value of the modulus of elasticity, measured at 4° C., of the film coating of the aged casing is at most about twice that of the unaged casing having a value of approximately 1,200 N/mm². The film coating has a barrier layer function, adequate for the intented purpose, against the permeation of water, water vapor and oxygen even after aging and a subsequent circumferential extension of the tubing skin in the range from about 10 to 35%.

By aged lacquer film coating is to be understood a lacquer film coating, the physical properties of which are established when the casing, on the outside of which it is located, is subjected immediately after manufacture to a storage period of at least eight weeks at room temperature (about 20° to 25° C.).

Insofar as its effect on determining the properties is concerned, the said aging of the tubing skin (also called long-term aging) corresponds to a storage of the casing for a period shortened in duration to 20 hours at an elevated temperature of 40° C.; this latter is also called heat-aging.

Immediately after its manufacture, the film coating on the casing corresponds in its physical properties to those of a self-supporting film of a copolymer which corresponds to the film coating in the qualitative and quantitative chemical build-up.

The physical parameters of a copolymer film coating of an aged casing correspond to those of an aged self-supporting film of a copolymer which, with respect to its qualitative and quantitative chemical build-up, corresponds to that of the copolymer film coating on the aged tubing skin. This applies in particular to film coatings or self-supporting films which, after aging, are subjected to a circumferential extension or other extension in the range from 10 to 35%.

As a definition within the scope of description of the present invention, the practical measure of an adequate barrier layer function of the lacquer film coating on the outside of the casing against the permeation of water, water vapor and oxygen is that the lacquer film coating imparts to the casing such a low permeability to water vapor that, when used for its intended purpose, the sausage casing meets the following conditions:

As a result of complete and tight covering of sausage-meat (for example, liver sausage-meat having a water content of about 30 to 50 percent by weight, relative to the total weight of the sausage-meat) sausages which can be manufactured using the casing according to the invention may not lose more than 1% of water per week, relative to the total weight of the sausage, after the sausages have been stored at a temperature in the range from 4° to 7° C. Within the said period, the sausage material also must not show any discoloration as a result of oxidation due to the action of oxygen.

The loss in weight of the sausage, caused by loss of water, is determined by weighing.

The above-mentioned condition is certainly met when the casing according to the invention, even after aging and subsequent circumferential extension in the range from 10 to 35%, has water vapor barrier values in accordance with Table 4. The circumferential extension of the film coating (radial extension) of the casing corresponds to an extension identical in percentage terms, of a strip of self-supporting film.

The so-called "blue test" can also be used as a measure of the physical homogeneity and closeness of the film coating, heat-treated or not heat-treated, on the outside of the casing after a circumferential extension of the casing in the range from 10 to 35%. This blue test on the tubing skin is carried out as follows: a 50 cm long piece of tubing of 60 mm diameter and a wall thickness of 95 to 105μ, corresponding to a weight per unit area of 95 to 110 g/m², is stored for 20 minutes in water at a temperature of 20° C., taken out of the water bath and freed from adhering water. One end of the tubing is closed by tying. The piece of tubing is then circumferentially extended by about 15% by blowing in compressed air at 0.6 atmospheres gauge. A 0.5% strength aqueous solution of methylene blue is then allowed to act on the outside of the tubing, for example, by immersing the outside of the tubing into this solution or applying the latter with a brush.

The same procedure is followed with a second specimen of the same tubing which had been subjected after its manufacture to heat-aging by exposing it to a temperature of 40° C. for a period of 20 hours. The piece of tubing with an aged film coating on its outside is then further treated as described above.

The supporting layer of cellulose hydrate lying below the film coating is colored blue at those points of the film coating which have become permeable to the test fluid as a result of over-extension.

The blue coloration of the specimens of tubing can be objectively determined, and compared with other specimens, by means of a micro-densitometric measurement. The blue test values are indicated in Table 1:

TABLE 1

"BLUE TEST"

| SAMPLES OF CASING | DENSITOMETER VALUE | |
|---|---|---|
| | Sample not heat-treated | Sample heat-treated for 20 hours at 40° C. |
| 1. Film coating of a copolymer according to Example 1, undyed | 1.0 | 1.0 |
| 2. Film coating of a copolymer according to Example 1, dyed | 1.06 | 1.10 |

The film coating on the outside of the casing is regarded as aging-resistant and its barrier layer function is regarded as substantially unchanged even after aging of the casing, as compared with the unaged tubing, whenever the blue coloration of the casing which has been aged and circumferentially extended in the range from 10 to 35% does not differ from that of the unaged casing. The corresponding values are compiled in the table.

A further criterion for the integrity of the film coating after a circumferential extension of the casing, in particular the circumferential extension after aging of the tubing, is its barrier layer action against the permeation of water, water vapor and oxygen. The permeability to water vapor, determined thereon, is to be taken as representative for this.

The tubing according to the invention comprises cellulose hydrate and, preferably, it is fiber-reinforced, the fiber-reinforcement comprising preferably a long-fibered paper fleece which is embedded as a matrix in the wall of the tubing. The manufacture of cellulose hydrate tubing and of fiber-reinforced cellulose hydrate tubing is well known.

The casing according to the invention advantageously has an adhesion-promoting layer of a synthetic chemical material, for example, a cationic resin, e.g., a layer of a melamine/formaldehyde resin or of a resin based on a reaction product of epichlorohydrin with a polyamine/polyamide. The adhesion-promoting resin layer is located between the film coating of copolymer and the fiber-reinforced casing layer of cellulose hydrate. Cellulose hydrate tubing with an adhesion-promoting interlayer is also conventional in the art.

The lacquer film coating which forms the outside of the packaging material according to the invention comprises a synthetic elastic copolymer of from about 90 to 92 percent by weight of vinylidene chloride, from about 5.5 to 7 percent by weight of acrylonitrile, from about 1.5 to 3.5 percent by weight of methyl methacrylate and from about 0.5 to 1.5 percent by weight of itaconic acid. In particular, the copolymer preferably comprises about 91 percent by weight of vinylidene chloride, about 6.2 percent by weight of acrylonitrile, about 2.1 percent by weight of methyl methacrylate and about 0.7 percent by weight of itaconic acid. The percent by weight data here relate in each case to the total weight of the copolymer which can be prepared by copolymerization of a mixture of copolymerizable monomers which is qualitatively characterized by those monomers from which the molecular structural units forming the copolymer and recurring therein after copolymerization are derived.

The mixture of monomers contains each of the monomers in quantities in percent by weight, relative to the total weight thereof, which in each case correspond to the proportion in percent by weight of molecular structural units of the copolymer, which quantify the chemical build-up thereof.

The essential properties of the copolymer film coating on the outside of the packaging material are determined by the physical-mechanical criteria thereof and by the molecular structural build-up of the copolymer forming the film coating.

The physical-mechanical elasticity characteristics, essential for the success desired according to the invention, of the film coating which is present on the outside of the packaging material and comprises a copolymer having the indicated qualitative and quantitative chemical build-up, are identical to those of a self-supporting film which consists of a copolymer which corresponds to that forming the film coating on the packaging material.

An essential physical criterion for the molecular structural build-up of the copolymer forming the film coating is the dependence of the relative viscosity of a copolymer solution on the concentration of the copolymer dissolved therein.

A further physical parameter which characterizes the molecular structural build-up of the copolymer forming the film coating is the dependence of the relative viscosity of the copolymer solution of a defined concentration on the temperature.

The elasticity of the film coating on the packaging material is characterized in that the value of the modulus of elasticity of the film coating at 4° C., even after aging of the material, is at most twice that of an unaged sample of packaging material having a value of the modulus of elasticity of approximately 1,200 N/mm$^2$ at 4° C.

The elasticity of the film coating, defined by the said characteristics of the modulus of elasticity, even at a low temperature, in conjunction with the special physical parameters (characteristic viscosity date and molecular weight distribution) which depend on the molecular structure and individualize the copolymer forming the film coating, is the reason that the barrier action of the film coating against the permeation of water, water vapor and oxygen remains preserved to an extent which is a prerequisite for the use of the packaging material in accordance with the intended purpose and is therefore desired according to the invention. These requirements are met even after aging of the casing according to the invention and subsequent extension thereof in the range from 10 to 35%.

A film coating having the said physical characteristic value corresponds in this respect to a self-supporting film which consists of a copolymer which, with regard to its qualitative and quantitative chemical build-up and its inherent physical characteristic values (characteristic viscosity data), is identical to that which forms the film coating of the packaging material.

A self-supporting film is to be regarded as a film which can be prepared from a lacquer solution which contains, as the dissolved film-forming proportion, a copolymer which, with regard to its qualitative and quantitative chemical build-up and to its physical characteristic data, coreponds to the copolymer which forms the film coating on the casing. To prepare the self-supporting film, a quantity of copolymer solution, corresponding to the intended thickness of the self-supporting film and of adequate concentration, is spread on a planar solid base, for example, a glass plate. The lacquer solution is then levelled to give a liquid layer of uniform thickness. Subsequently, the solvent is expelled from the liquid layer and the self-supporting copolymer film is then drawn off the glass plate serving as its base.

The film coating on the outside of the packaging material is also characterized physically-mechanically in that its barrier layer action against the permeation of water, water vapor and oxygen, even after aging and a subsequent circumferential extension thereof in the range from 10 to 35%, is substantially unchanged as compared with a correspondingly extended, unaged film coating.

The film coating on the outside of the packaging material is individually characterized materially-chemically in that the copolymer from which it is formed (comprised of from about 90 to 92 percent by weight of vinylidene chloride, from about 5.5 to 7 percent by weight of acrylonitrile, from about 1.5 to 3.5 percent by weight of methyl methacrylate and from about 0.5 to 1.5 percent by weight of itaconic acid) has the following viscosity characteristics which are indicated in Tables 2 and 3 and which individualize its molecular structure:

TABLE 2

(corresponding to FIG. 1

Dependence of the relative viscosity of a solution, containing the copolymer forming the film coating, on the concentration thereof:
The solvent consists of a mixture of tetrahydrofuran and toluene in the ratio of 70 : 30.
The dependence is represented by the following pairs of values:

| 1. Concentration of the copolymer solution % by weight | 2. Relative viscosity of the copolymer solution according to 1., measured at 23° C. ± 0.1 |
| --- | --- |
| 0.1 | 1.04 |
| 0.5 | 1.25 |
| 1.0 | 1.45 |
| 1.5 | 1.70 |
| 2.0 | 2.00 |
| 2.5 | 2.35 |
| 3.0 | 2.80 |

The entire course of the curve according to FIG. 1, which is determined by the pairs of values according to Table 2 and has a concave curvature and which reproduces the dependence of the specific viscosity of a solution containing the copolymer forming the film coating on the particular concentration thereof, is to be represented for the sake of definition by the particular initial and final values thereof.

A concave curve is defined as a curve which is characterized in that, over its entire course, the relative viscosity always rises with an increasing copolymer concentration of the solution.

TABLE 3

Figure 2:
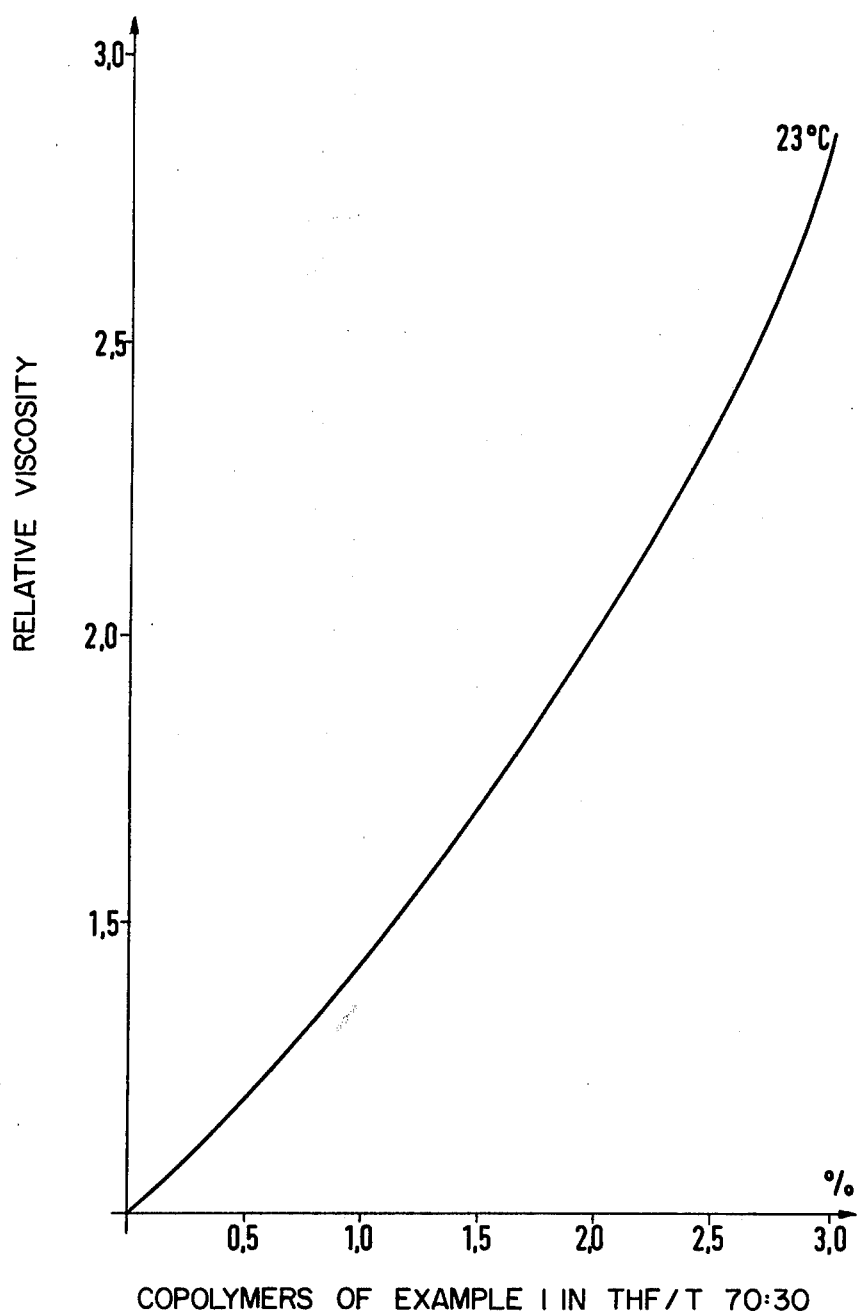
FIG. 2 is a plot of relative viscosity against polymer concentration in a 70:30 solution of tetrahydrofuran and toluene for a copolymer according to the invention.

(corresponding to FIG. 2)
Dependence of the relative viscosity of a solution of the copolymer in tetrahydrofuran on the temperature:

| (a) 1% strength by weight copolymer solution | |
| --- | --- |
| Temperature at which the copolymer solution is measured | Relative viscosity of the copolymer solution |
| 5° C. | 1.73 |
| 20° C. | 1.66 |
| 35° C. | 1.62 |

TABLE 3-continued (corresponding to FIG. 2)
Dependence of the relative viscosity of a solution of the copolymer in tetrahydrofuran on the temperature:

| 45° C. | 1.58 |
| --- | --- |
| (b) 3% strength by weight copolymer solution | |
| Temperature at which the copolymer solution is measured | Relative viscosity of the copolymer solution |
| 5° C. | 3.92 |
| 20° C. | 3.70 |
| 35° C. | 3.50 |
| 45° C. | 3.36 |

The mean degree of polymerization $P_w$ (weight average) of the copolymer which according to the invention forms the film coating is 1,030, the mean degree of polymerization $P_n$ (number average) is 455 and the heterogeneity of the polymer, $P_w/P_n$, is 2.3. $P_w$ and $P_n$ are obtained by fractionation by gel chromatography on a separation column, filled with Styrogel, at 45° C. with tetrahydrofuran as the mobile phase and were related to polystyrene as a calibration substance.

The said copolymers form the essential constituent of the film coating on the outside of the packaging material; however, the coating can additionally contain fillers, plasticizers and/or waxes in quantities which do not adversely affect the desired properties of the film coating. Film coatings which contain wax in addition to the copolymer fraction, contain a proportion of wax in an overall range from about 1 to 5 percent by weight, relative to the total weight of the coating. Examples of suitable waxes are those based on esterified montanic acids, polyethylene waxes and waxes based on oxazoline.

Chemical plasticizers which can be used for the copolymer forming the coating are esters of phthalic acid, citric acid, sebacic acid, or of tartaric acid and epoxidized unsaturated fatty acid esters, which are then employed in an overall range from about 5 to 15 percent by weight, preferably about 10 percent by weight, relative to the total weight of the film coating. If the film coating contains a filler, for example kaolin or silica, this is present therein in an amount in the range from about 0.5 to 5 percent by weight, relative to its total weight.

The film coating has a thickness which corresponds to a weight per unit area in the range from about 3 to 10 g/m$^2$.

The invention also relates to processes for the manufacture of tubing skins according to the invention. The following text explains, by way of example, how the process is carried out:

Flattened fiber-reinforced tubing of cellulose hydrate having on its outside an adhesion-promoting layer of a chemical material, for example melamine/formaldehyde resin, is drawn at a steady speed from a stock roll on which it is wound. The flattened tubing which is moved forward in the direction of its longitudinal axis at a constant speed, for example, in the range from about 20 to 80 m/minute, is then guided around part of the surface of a first deflection roller which is in a fixed arrangement above a trough and is designed to be rotatable on a horizontal axis and is deflected downwardly (in the direction of the forward movement of the tubing) and introduced into the trough filled with coating lacquer.

A second deflection roller is rotatably mounted in a fixed arrangement in the trough, the horizontally extending axis of this roller being below the liquid level of the coating lacquer solution with which the trough is filled. The tubing in the flattened state is looped around part of the surface of the second deflection roller and then guided vertically upwardly (in the direction of the forward movement of the tubing). The arrangement of the trough relative to the first deflection roller is here such that the two deflection rollers extend with their axes parallel.

The liquid coating lacquer solution contains a volatile organic solvent or mixtures of organic solvents in a total amount in the range between about 70 and 90 percent by weight, preferably about 80 percent by weight. The volatile liquid fraction of the coating lacquer solution consists of organic solvents or solvent mixtures, in which the said copolymers are soluble. Particularly advantageously, this fraction comprises a mixture of tetrahydrofuran and toluene in the ratio of 70:30. The lacquer solution contains from about 10 to 30 percent by weight, relative to its total weight, of dissolved copolymer, for example, of a copolymer which comprises 91 percent by weight of vinylidene chloride, 6.2 percent by weight of acrylonitrile, 2.1 percent by weight of methyl methacrylate and 0.7 percent by weight of itaconic acid. If desired, the solution can contain fillers, chemical plasticizers and wax.

Sufficiently far above the trough, a levelling device is provided for forming a uniformly thick liquid lacquer layer on the entire outside of the flattened tubing which is vertically guided. The liquid lacquer layer is the precursor of a closed film coating which results from the lacquer layer after driving off the volatile solvent. The levelling device can consist, for example, of known mechanical doctor blades or of known so-called air knives.

After a uniformly thick liquid layer of lacquer solution has been spread over the entire outside of the tubing, hot air is allowed to act on the tubing and this has the effect that the volatile constituents of the lacquer layer are driven off and a closed film coating is formed on the outside of the flattened tube.

The thickness of the liquid lacquer layer is here adjusted in such a way and the concentration of dissolved copolymer in the lacquer solution is selected in such a way that, after drying of the latter, the film coating formed has a thickness which corresponds to a weight per unit area of the film coating in the range from about 3 to 10 g/m$^2$, preferably about 5 g/m$^2$.

The drying of the lacquer layer on the tubing can, for example, be effected by passing it through a drying tunnel which is charged with hot air of a temperature in the range from about 110° to 130° C.

The re-conditioning of the dried tubing, in order to adjust the water content in the carrier layer of the tubing of cellulose hydrate to about 8 to 10 percent by weight, relative to the weight thereof, is effected, for example, by passing the tubing through a further tunnel which is operated with hot air of a temperature in the range from about 80° to 98° C., the hot air being saturated with steam.

The moistening of the tubing is regulated here in such a way that the tubing afterwards has a water content in the range from about 8 to 10 percent by weight, relative to its total weight. The coating lacquer in the trough has, for example, the composition indicated above.

Figure 3:
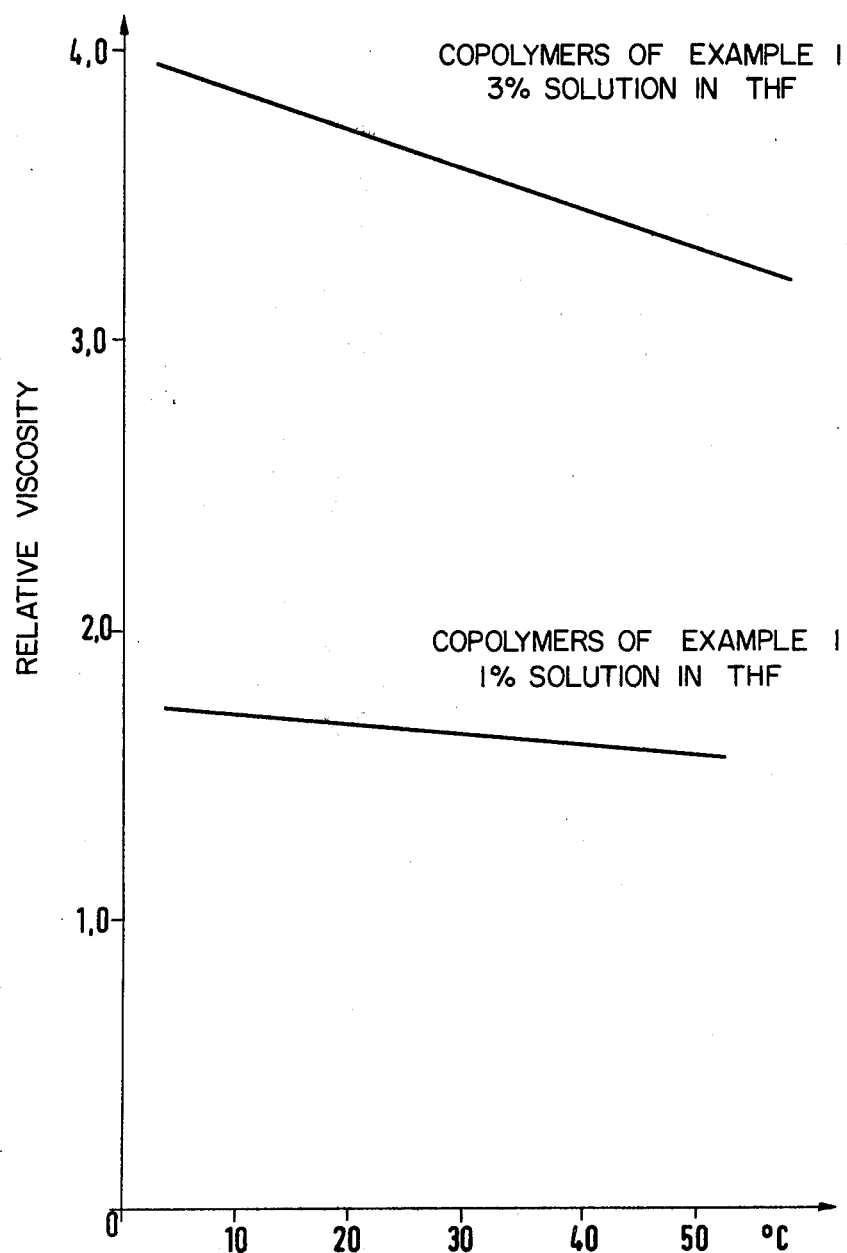
FIG. 3 is a plot of relative viscosity against temperature for both a 1% and a 3% solution in tetrahydrofuran of a copolymer according to the invention.

FIG. 3 of the drawings illustrates, by way of example, how the process is carried out.

In FIG. 3, reference numeral 1 designates the stock roll with wound-up, flattened, fiber-reinforced cellulose hydrate tubing 2 with an adhesion-promoting chemical substance on its surface. The first deflection roller 3 is mounted above trough 4, which contains the second deflection roller 5. The coating lacquer 6 in the trough is applied to the flattened tubing 7 emerging from the trough 4 to provide a liquid layer 8a of coating lacquer on its outside. Knife device 9 adjusts the lacquer layer 8a to a preset thickness 8b, and then the tubing is passed into drying tunnel 10, from which emerges tubing 11 with a film coating 12 on its outside. The tube then passes through re-conditioning tunnel 13 and then to a third deflection roller 14 of rotatable design and to a stock roll 15 for winding up the tubing provided with a film coating on its outside.

Advantageously, the stock roll 15 is designed to be driven, like the deflection roller 14 and the deflection roller 3, and is driven by drive means, for example, an electric motor 16.

The following examples further illustrate the preferred embodiments of the invention without in any sense being limitative.

EXAMPLE 1

The outside surface of a fiber-reinforced tubing of cellulose hydrate, which contains about 22 percent by weight of glycerol relative to the total weight of the tubing as a plasticizer for cellulose hydrate and which has on its outside an anchoring layer of melamine/formaldehyde resin, is continuously brought into contact with coating liquid by drawing the tubing to be coated in the flattened state from a stock roll on which it is wound up, and then passing it in the flat state at a steady speed in the direction of the longitudinal axis through coating liquid which is present in a trough which is open at the top. Sufficiently far above the bottom of the trough, a first deflection roller with its axis parallel thereto is fixed in a rotatable mounting. While it moves forward, the tubing loops around part of the deflection roller. The liquid coating lacquer solution fills the trough to such a level that the roller is completely immersed in the coating liquid for the entire duration of the process.

The coating lacquer solution in the trough advantageously has a temperature of 35° C. The coating liquid has the following composition: 400 parts by weight of a solvent mixture consisting of 70 parts by volume of tetrahydrofuran and 30 parts by volume of toluene; dissolved therein 100 parts by weight of a copolymer which is prepared by copolymerization of a mixture of monomers comprising 91 percent by weight of vinylidene chloride, 6.2 percent by weight of acrylonitrile, 2.1 percent by weight of methyl methacrylate and 0.7 percent by weight of itaconic acid, each relative to the total weight of the mixture of monomers. The copolymer is capable of forming a self-supporting film which, immediately after its preparation, has a value of the modulus of elasticity of about 1,200 N/mm$^2$ and, after aging (storage of the film at 40° C. for 20 hours) has a value of the modulus of elasticity of about 2,400 N/mm$^2$. The molecular structural build-up of the copolymer, which is expressed in terms of the dependence of the specific viscosity of a solution containing the dissolved copolymer forming the film coating on the concentration of the solute and in the dependence of the specific viscosity of a 1% strength by weight or 3% strength by weight solution containing the copolymer forming the film coating on the temperature, is characterized by the specific data in Tables 2 and 3.

Additionally, the solution contains as dissolved constituents 3 parts by weight of wax and 1 part by weight of kaolin, which has been rendered hydrophobic.

The flattened tubing is passed through the coating liquid at a set speed.

After passing through the coating liquid present in the trough, the tube is passed forward in a vertically upward direction after it has been deflected by means of a second deflection roller in the trough. The liquid layer on the outside of the flattened tubing is then levelled, in a manner which is in itself known, by means of known devices, for example so-called "doctor rollers" to such a thickness that the film coating on the outside of the tubing corresponds to a weight per unit area of 5 g of copolymer per $m^2$ after the volatile medium in the layer has been driven off.

After levelling of the liquid layer of lacquer solution on the outside of the tubing, the latter is subjected in the flattened state, still running vertically, to the action of heat which has the effect of drying the layer on the outside of the tubing. This is effected, by passing the tubing through a drying tunnel which is operated with hot air of a temperature of about 115° C.

After a closed film coating has been formed on the outside of the tubing as a result of the action of heat in the drier, the tubing is then re-conditioned and thus brought to a water content of about 8 to 10 percent by weight, relative to its total weight. This is effected, by passing the tubing through a tunnel which is charged with hot air saturated with steam at a temperature of 80° to 98° C.

A sufficiently long piece of the tubing prepared is filled in a known manner with sausage-meat, for example, liver sausage-meat (water content about 50 percent by weight, relative to the total weight of the meat) and is tightly closed on both ends.

During the filling process, the sausage casing of caliber 60 (wall thickness of the casing: 0.097 mm) is circumferentially extended by about 10 to 25%.

After the liver sausage has been stored in the refrigerating chamber for eight days at a temperature in the range from 0° to 7° C., the sausage-meat enclosed in the tubing skin shows a loss of water of <1% and does not show any discoloration due to an undesired access of air to the sausage-meat.

The tubing, according to the example, which has been rolled up to give wound film does not stick on the roll. The film coating on the outside of the casing is so strongly joined to the tubing that it is not detached from its substrate even after boiling in water for 20 hours.

The tubing prepared according to the example can be stored for a prolonged period even under tropical conditions (40° C.; 85% relative atmospheric humidity) without damage to the film coating occurring after it has been filled with sausage-meat.

EXAMPLE 2

The procedure of Example 1 is repeated, but with the modification that the solution used for the preparation of the film coating additionally contains 10 parts by weight of dibutyl phthalate as a plasticizer.

The coating prepared according to Example 2 is even more supple than that according to Example 1.

EXAMPLE 3

The procedure of Example 1 is repeated, but with the modification that the coating solution additionally contains 10 parts by weight of tributyl acetylcitrate as a plasticizer and that hard paraffin of melting point 60° to 62° C. is used in place of the ester wax.

EXAMPLE 4

The procedure of Example 1 is repeated, but with the modification that the coating liquid additionally contains 5 parts by weight of diisobutyl tartrate as a plasticizer for the synthetic copolymer.

EXAMPLE 5

The procedure of Example 1 is repeated, but with the modification that polyethylene wax is used in place of ester wax. The tubing prepared to Example 5 is distinguished in that the film coating shows a matt effect.

EXAMPLE 6

The procedure of Example 1 is repeated, but with the modification that, instead of kaolin, the filler used as silica of an average particle size of $3\mu$.

The modulus of elasticity of a film corresponding to the film coating on the outside of the tubing prepared according to Example 1 (determined before and after aging thereof) is measured on a film which has a thickness of about $25\mu$ and which is prepared as follows:

A 20 percent strength by weight solution of a copolymer (corresponding to the film coating on the outside of the tubing according to Example 1) is prepared in a solvent mixture consisting of tetrahydrofuran and toluene in the ratio of 70:30. This lacquer solution is applied to a glass plate and levelled with the aid of a so-called film spreader to a liquid coating of a thickness of about $125\mu$, and is spread on the glass plate.

To drive off the solvent, the liquid lacquer film on the surface of the glass plate is then subjected to the action of heat at a temperature of 120° C. during a period of 10 minutes. After immersing the glass plate into a water bath, the copolymer film is then drawn off the glass plate, and immediately afterwards, while still wetted with water is cut into strips each of 100 mm length and 20 mm width. The strips of self-supporting copolymer film to be measured have a thickness of $25\mu$. The strips to be measured are freed from adhering water by dabbing with blotting paper.

The modulus of elasticity of the copolymer film is determined in each case on an unaged film specimen and on an aged (20 hours/40° C.) film specimen having a thickness of $25\mu$. The measurement of the relative viscosity of the copolymer forming the film coating according to Example 1 is carried out by the method indicated by Ubbelohde. The characteristic viscosity data found for the copolymer according to Example 1 are set forth in Tables 2 and 3.

Film coatings which consist of a copolymer on the outside of tubular casings and which have a modulus of elasticity value, determined after aging, which is more than 100% greater than that of an unaged coating, are unsuitable, according to the invention since there is a risk that damage to the film coating will occur when the aged tubing is circumferentially extended in the range from 10 to 35%. Due to the damage to the film coating, the latter does not have a barrier action which is adequate for the intended purpose of the casings according to the invention to prevent against the permeation of water, water vapor and oxygen.

The "water loss" values which characterize the barrier layer action of the film coating on casings according to the invention are set forth in Table 4 both for a state without heat-treatment after storage of the tubing for 4 to 20 hours and with heat-treatment at 40° C. for 20 hours:

TABLE 4

| | % WATER LOSS* OF | |
|---|---|---|
| | (a) casing without heat-treatment | (b) casing heat-treated for 20 hours at 40° C. |
| Film coating of copolymer according to Example 1 | 50 g/m² · 24 hours | 60 g/m² · 24 hours |

*determined on casings treated according to (a) or (b), in each case after storage at 39° C. for 20 hours The values indicated in Table 4 are determined on the following test specimens:

A 50 cm long piece of tubing prepared according to Example 1, having an internal diameter of 60 mm and a total wall thickness corresponding to a weight per unit area of 95 to 100 g/m², is stored in water at 20° C. for 20 minutes. One end of the tubing is then firmly closed by tying and the tubing is inflated through the other opening with compressed air of 0.6 atmosphere gauge and is thus circumferentially extended by 10 to 15%.

A cellulose hydrate sponge cloth (dimensions 25×25 cm) which is saturated with water and has a total weight in the range from 100 to 140 g, is then inserted into the circumferentially extended test specimen of the tubing.

The tubing is then tightly closed at both ends. The tubing package filled with the water-containing sponge cloth is then stored in a drying cabinet at 39° C. and its weight loss (as a result of a loss of water due to evaporation of water vapor through the tubing wall to the outside) after 4 or 20 hours is determined by reweighing the tubing. The values found are recalculated for 1 m² of tubing surface area.

In a second experimental series, the tubing is stored for a period of several weeks at 20° C. before its intended use, that is to say, soaking in water and subsequent filling with sausage-meat under pressure is simulated by first storing (heat-treating) the tubing prepared according Example 1 in a drying cabinet at 40° C. for 20 hours. Tubing which has been heat-treated in this way is then further treated, after cooling down to room temperature, in the manner described above and the values for water loss are determined.

The test results permit a statement to be made about the water vapor tightness of the film coatings on the outsides of the test specimens.

The extensibility of the self-supporting film of copolymer according to Example 1 (which can be prepared as indicated) can be seen from Tables 5 and 6:

TABLE 5

| | UNAGED | AGED (20 hours/40° C.) |
|---|---|---|
| measured at 23° C. | 220% | 35% |

TABLE 6

Extensibility* of a film of copolymer corresponding to the film forming the film coating according to Example 1 containing 10% by weight of dibutyl phthalate.

| | UNAGED | AGED (20 hours/40° C.) |
|---|---|---|
| measured at 23° C. | 250% | 200% |
| measured at 4° C. | 40% | 30% |

*The extensibility of the film sample in percent indicates its uniaxial change in length, relative to the initial length.

The extensibility (extension) of the self-supporting copolymer film, relative to its original dimension, indicates the limit of extension up to which it is extensible while maintaining a barrier layer function against the permeation of water, water vapor and oxygen which is adequate for the intended purpose of the packaging material. The limit of extension of the self-supporting film, indicated in percent, corresponds to that of a film coating on the outside of the tubing where the film coating consists of the same copolymer as the self-supporting film, with a corresponding extension of the tubing in the circumferential direction.

What is claimed is:

1. A packaging material comprising a base layer of cellulose hydrate having on one surface a film coating which is impervious to water vapor, water and oxygen and which comprises a vinylidene chloride copolymer containing from about 90 to 92 percent by weight of vinylidene chloride, from about 5.5 to 7 percent by weight of acrylonitrile, from about 1.5 to 3.5 percent by weight of methyl methacrylate and from about 0.5 to 1.5 percent by weight of itaconic acid, said copolymer having a relative viscosity of about 1.04 measured at 23° C. in a 0.1 percent strength by weight solution in a mixture of tetrahydrofuran and toluene in the ratio of 70:30, and a relative viscosity of 2.8 measured at 23° C. in a 3 percent by weight solution in a mixture of tetrahydrofuran and toluene in the ratio of 70:30, and said film coating having a thickness corresponding to a weight per unit area in the range between about 3 and 10 g/m².

2. A packaging material as claimed in claim 1, wherein the film coating has a modulus of elasticity value after aging which is at most twice that of the film coating before aging, and wherein said value before aging is approximately 1,200 N/mm².

3. A packaging material as claimed in claim 1, wherein an adhesion-promoting layer comprising a synthetic cationic resin is located between the film coating of copolymer and the base layer of cellulose hydrate.

4. A packaging material as claimed in claim 3, wherein the adhesion-promoting layer comprises a melamine/formaldehyde reaction product or a reaction product of epichlorohydrin with a polyamine/polyamide.

5. A packaging material as claimed in claim 1, wherein said copolymer contains about 91 percent by weight of vinylidene chloride, about 6.2 percent by weight of acrylonitrile, about 2.1 percent by weight of methyl methacrylate and about 0.7 percent by weight of itaconic acid.

6. A packaging material as claimed in claim 1, wherein the coating additionally contains a total of from about 1 to 5 percent by weight of a wax based on esterified montanic acid, polyethylene waxes, paraffin wax, and/or oxazoline wax.

7. A packaging material as claimed in claim 6 wherein the coating contains from about 0.5 to 5 percent by weight of an inorganic slip agent, such as kaolin, kaolin which has been rendered hydrophobic or silica.

8. A packaging material as claimed in claim 7, wherein the inorganic slip agent has a mean particle size of from about 1 to 3μ.

9. A packaging material as claimed in claim 7, wherein the coating contains a total of from about 5 to 15 percent by weight of a plasticizer.

10. A packaging material as claimed in claim 9, wherein said plasticizer comprises dibutyl phthalate, tributyl acetylcitrate, diisobutyl tartrate or an epoxidized unsaturated fatty acid ester.

11. A packaging material as claimed in claim 1, comprising a tubular configuration.

12. A sausage product comprising an artificial sausage casing and a meat-containing filling contained therein, wherein said sausage casing comprises said packaging material as defined by claim 1.

13. A process for the manufacture of packaging material, which comprises the steps of drawing a tubing of cellulose hydrate from a stock roll, applying a liquid lacquer solution to one side of the moving tubing, said solution containing a copolymer comprising from about 90 to 92 percent by weight of vinylidene chloride, from about 5.5 to 7 percent by weight of acrylonitrile, from about 1.5 to 3.5 percent by weight of methyl methacrylate and from about 0.5 to 1.5 percent by weight of itaconic acid, said copolymer having a relative viscosity of about 1.04, measured at 23° C. in a 0.1 percent strength by weight solution in a mixture of tetrahydrofuran and toluene in the ratio of 70:30, and a relative viscosity of about 2.8, measured at 23° C. in a 3 percent strength by weight solution in a mixture of tetrahydrofuran and toluene in the ratio of 70:30, levelling the lacquer to a predetermined thickness and drying it to give a film coating which comprises said copolymer having a thickness corresponding to a weight per unit area in the range between about 3 and 10 g/m².

14. A process as claimed in claim 13, wherein the copolymer comprises about 91 percent by weight of vinylidene chloride, about 6.2 percent by weight of acrylonitrile, about 2.1 percent by weight of methyl methacrylate and about 0.7 percent by weight of itaconic acid.

15. A process as claimed in claim 13, wherein the lacquer solution contains a total of 1 to 5 percent by weight of a wax based on esterified montanic acid, polyethylene waxes, paraffin wax and/or oxazoline wax, relative to the weight of the coating.

16. A process as claimed in claim 13, wherein the coating lacquer contains 0.5 to 5 percent by weight of an inorganic slip agent in the form of kaolin or silica, relative to the weight of the coating.

17. A process as claimed in claim 16, wherein the slip agent has a mean particle size of 1 to 3μ.

18. A process as claimed in claim 13, wherein the coating lacquer contains a total of 5 to 15 percent by weight of a plasticizer for the synthetic copolymer, said plasticizer being selected from dibutyl phthalate, tributyl acetylcitrate, diisobutyl tartrate or an epoxidized unsaturated fatty acid ester.

19. A process as claimed in claim 13, wherein the lacquer solution contains a liquid, volatile fraction in the range from about 70 to 90 percent by weight relative to the total weight of the lacquer solution.

20. A process as claimed in claim 13, wherein the liquid, volatile fraction of the lacquer solution comprises an organic liquid.

21. A process as claimed in claim 20, wherein the volatile fraction of the lacquer solution comprises a mixture of tetrahydrofuran and toluene in the ratio of about 70:30.

22. A process as claimed in claim 13, wherein one side of the tubing of cellulose hydrate is coated with an adhesion-promoting layer of a synthetic cationic resin prior to applying the liquid lacquer solution thereto.

23. A process as claimed in claim 22, wherein the adhesion-promoting layer located between the tubing of cellulose hydrate and the liquid lacquer solution comprises a melamine/formaldehyde reaction product or a reaction product of epichlorohydrin with a polyamine/polyamide.

* * * * *